Jan. 25, 1966        H. MÜLLER        3,231,070
CONVEYOR WITH REMOVABLE SLATS
Filed Sept. 27, 1963
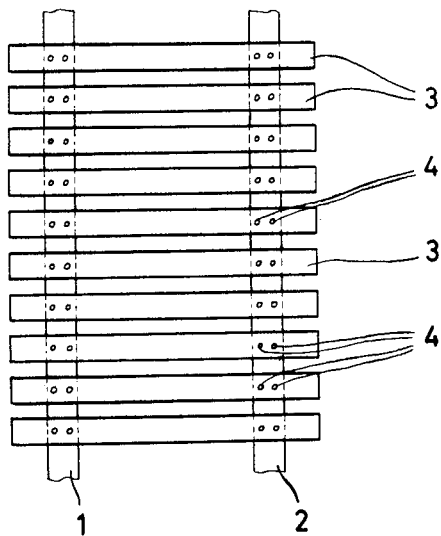
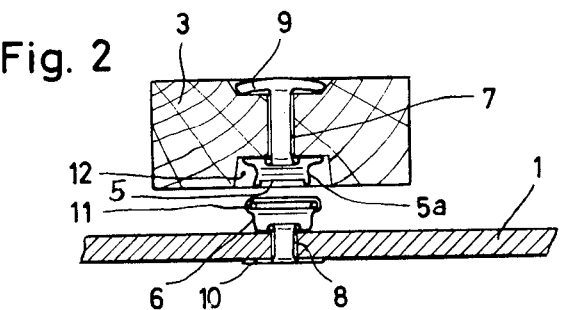
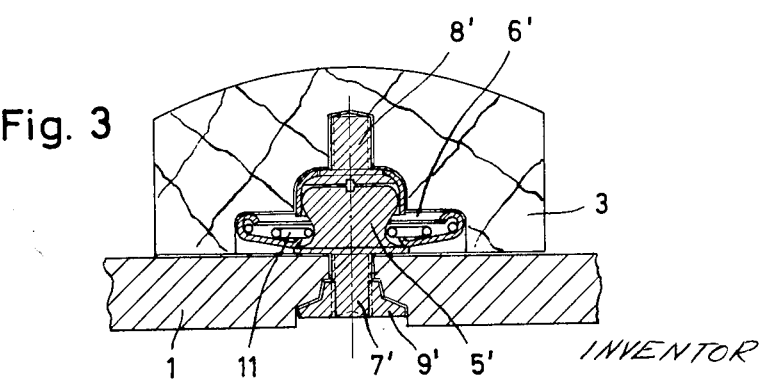
INVENTOR
HUGO MULLER
BY Bair, Freeman &
Molinare ATTYS

United States Patent Office 3,231,070
Patented Jan. 25, 1966

3,231,070
CONVEYOR WITH REMOVABLE SLATS
Hugo Müller, Squindostrasse 4, Nordlingen,
Bavaria, Germany
Filed Sept. 27, 1963, Ser. No. 312,141
Claims priority, application Germany, Oct. 6, 1962,
M 54,410
2 Claims. (Cl. 198—195)

The invention relates to conveyors made up of slats attached to one or more slat carriers, preferably endless belts.

Such slat conveyors are widely used in the textile industry and they have applications in practically every field of mechanical handling, for instance for conveying parcels in post offices and in association with industrial machinery and plants of diverse kinds.

The goods which are to be conveyed are directly deposited and conveyed on the slats of the traveling conveyor. Consequently the slats undergo considerable wear, the rate of which depends upon the nature of the handled goods or materials. On the other hand, the life of the carriers, which are usually in the form of endless leather or rubber belts, is very much longer than that of the slats because the carriers experience far less wear. Generally speaking, the rate of wear of the slats is so much higher than that of the carriers that the slats require replacement two or three times during the life of the carriers.

The conventional method of attaching the slats to the carriers is to secure them by rivets or screws or to use pins which pass through the carriers as well as the slats, like a nail, and which are then bent and knocked flat on the outside of the carriers or the slats. From the point of view of slat replacement, these methods of securing the slats have the disadvantage that the slats cannot be removed except with the aid of special tools after the conveyor has been dismantled. This means that whenever the worn slats require renewal the entire conveyor may have to be stopped for a prolonged period of time. In some machines and installations, it may even be necessary to dismantle a large number of parts of the machine itself before the conveyor can be taken out. No known form of construction permits this work of replacement of worn slats by new ones to be done in situ conveniently and without considerable waste of time.

The object of the present invention is to provide a slat conveyor in which the slats may be conveniently removed without tools and without dismantling or shutting down the conveyor on which they are carried.

In a preferred form of the invention the slats are attached to a slat carrier by spring or snap fasteners (such as press studs) each of which comprises separable interengaging parts carried by a slat and a slat carrier respectively and held by spring action against separation. This arrangement permits all the slats to be removed rapidly without the use of a tool and fresh slats to be affixed to the carriers in the same simple way in situ inside a machine without the need of dismantling and putting the conveyor out of action for a long period of time. The arrangement also permits a slat conveyor to be provided rapidly with different types of slats adapted to particular needs, for instance by substituting for the usual simple slats other slats which fit closely together like the slats of a Venetian blind and thereby form a conveyor resembling a plain belt conveyor. Alternatively, slats can be fitted which have various types of openings for the goods that are to be handled thereon, with a view to providing firm anchorage for the goods during transportation on the conveyor. Thereby the conveyor can be readily adapted to the handling of containers which have bases of different cross sections (e.g., round, polygonal, or oval) as is often the case with containers which are to be filled with medicines, perfumes or beverages.

The press studs may be of any desired and convenient form. Moreover, the two interengaging parts of the press studs may be affixed to the cooperating surfaces of the slat and the carrier in any suitable manner, for instance by means of an adhesive or by providing the parts of the press stud with stems anchored in the slat and carrier respectively.

Preferably, two relatively spaced press studs are provided at each intersection between a slat and a carrier where a joint is to be formed. This permits the studs to take up torsional forces in the plane of the conveyor, which arise when there is a tendency for angular displacement between the slats and the carrier.

The following is a description, by way of example, of an embodiment of the present invention, reference being made to the accompanying schematic drawings, in which FIGURE 1 is a plan view of part of a slat conveyor in accordance with the invention.

FIGURE 2 is a cross-sectional view of a connection between a slat and a carrier, and FIGURE 3 is a cross-sectional view of a modified form of connection between a slat and a carrier.

The conveyor comprises one or more carriers 1 and 2 to which are attached, at predetermined intervals selected according to the contemplated application, transverse slats 3 for supporting the goods which are to be conveyed. The carriers 1 and 2 may be endless belts made, for example, of leather or rubber. The slats 3 will usually consist of wood but, if desired, they may be of other suitable material.

The slats 3 are attached to the surfaces of the carriers 1 and 2 by press studs 4. As shown in FIGURE 1, it is preferred to provide two or more press studs at each intersection between carrier and slat where fixing is required. The press studs are spaced apart so as to be capable of taking up torsional forces in the plane of the slats. Consequently the correct angle between the slats and the carriers, usually a right angle, will be maintained even if torsional forces do arise.

The press studs may be of conventional construction. For instance, as illustrated in the drawings, they may comprise a roughly cylindrical head 5 (or 5') which can be pushed into a socket member 6 (or 6') containing a spring ring 11.

Various means may be used for attaching the press studs to the components of the conveyor.

In the construction illustrated in FIGURE 2, the two complementary parts 5 and 6 of the press stud which can be pressed into engagement are attached to anchorages in the form of stems 7 and 8 respectively, which pass through holes in the slat 3 and the carrier 1, and which are formed with enlarged ends 9 and 10 on the sides of the slat and carrier remote from the stud. For affixing the press stud, the free ends of stems 7 and 8 are pushed into openings in the cooperating parts of the stud and rigidly located by riveting over. The male portion 5 flares outwardly at the bottom to provide a waist 5a into which the spring ring 11 will snap when the flared end is pushed therethrough.

In the construction shown in FIGURE 3, the interengaging button head 5' and socket 6' of the press stud are provided with threaded stems 7' and 8' suitable for metal or wood. These stems are screwed into the slat 3 and the carrier 1 respectively. The stem 8' forms part of a countersunk screw which passes through a hole in the socket 6' of the stud, whereas the stem 7' is firmly connected to the head portion 5' of the stud which therefore simultaneously forms a head for the stem. The threaded stem 7', which bites into the carrier 1, is preferably secured by a taper bush 9' in this form of construction.

Instead of using mechanical fixing means as described, the parts 5 and 6 of the stud may be attached to the faces of the carrier and of the slat with the aid of an adhesive.

For insuring flush contact between the slats and the cooperating surface of the carrier, it is advisable to countersink in a recess 12 that part 5 of the stud which is attached to the slat. The recess 12 for the reception of the part 5 is large enough to receive also the cooperating part 6 of the stud attached to the carrier when the two parts of the stud are pressed into engagement. The adjacent surfaces of the slats and the carriers can thus be pushed into close contact.

In order to provide a smooth surface on the top of the slat the enlarged end portion 9 of the anchoring stem 7 may be likewise countersunk, as shown in FIGURE 2, so that no projections interfere with the goods carried on the conveyor.

Functionally, it is quite immaterial whether the part 5 of the press stud is fixed to the slat and the part 6 is attached to the carrier, or whether the converse arrangement is used. Other modifications will be apparent to those skilled in the art without departing from the basic concept of my invention herein described.

I claim:

1. A slat conveyor comprising a pair of spaced endless belts, a plurality of slats positioned transversely of said belts, a pair of first snap fastener elements mounted on said belt at each of the intersections between said slats and said belts, and a pair of second fastener elements mounted on each of said slats at said intersections for engagement with said first snap fastener elements, to provide for detachable engagement for said slats on said belts, said pair of snap fastener elements providing for take-up in torsional forces in the plane of said conveyor.

2. The device of claim 1 wherein said second snap fastener elements are countersunk in each of said slats to permit said slats to rest substantially flush on the upper surface of said belts when said elements are snapped together.

References Cited by the Examiner
UNITED STATES PATENTS

| | | | |
|---|---|---|---|
| 704,823 | 7/1902 | Gordon | 198—199 |
| 1,723,357 | 8/1929 | Koopman | 198—195 |
| 2,102,569 | 12/1937 | Johnson | 198—175 |
| 2,395,761 | 2/1946 | Reed | 198—199 |
| 2,439,040 | 4/1948 | Cohen | 198—175 X |
| 2,524,186 | 10/1950 | Beninger | 198—195 |

HUGO O. SCHULZ, *Primary Examiner.*

SAMUEL F. COLEMAN, R. E. KRISHER,
*Assistant Examiners.*